Dec. 3, 1946.  W. L. RIPPETEAU, JR  2,412,010
PURIFICATION OF TOLUENE
Filed April 24, 1944
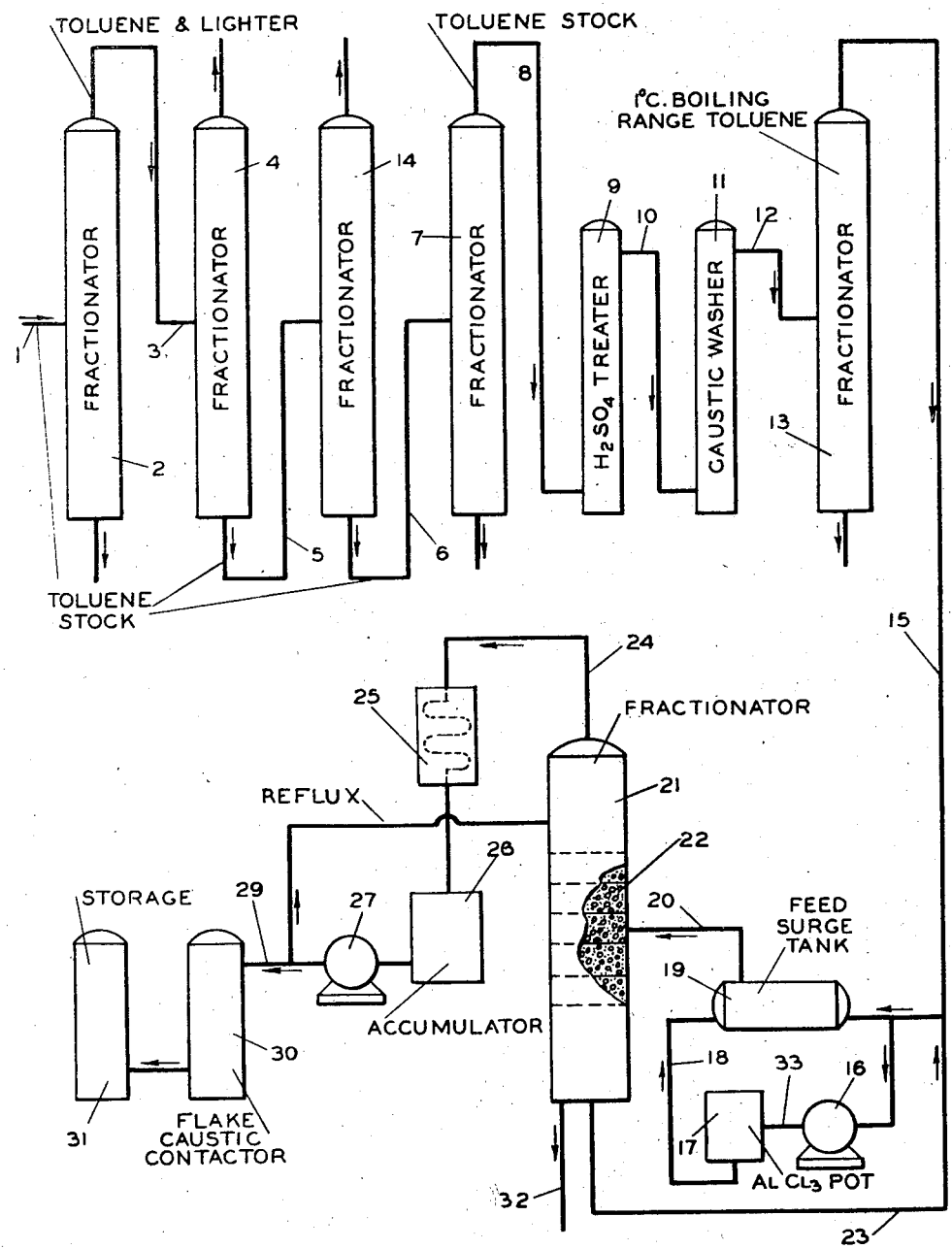
INVENTOR
WALTER LESLIE RIPPETEAU, JR.
BY Hudson, Young & Yuiger
ATTORNEYS Patented Dec. 3, 1946

2,412,010

UNITED STATES PATENT OFFICE 2,412,010

PURIFICATION OF TOLUENE

Walter L. Rippeteau, Jr., Baltimore, Md., assignor to Phillips Petroleum Company, a corporation of Delaware Application April 24, 1944, Serial No. 532,493

6 Claims. (Cl. 260—674)

This invention relates to the treatment of aromatic hydrocarbon stocks and more particularly it relates to the treatment of aromatic stocks having narrow boiling ranges for the removal of such hydrocarbons as olefins, diolefins, etc., whereby the aromatic hydrocarbon is so purified as to meet commercial standards.

The usual method for producing toluene includes very close fractionation of the original toluene containing stock to produce a "toluene concentrate." This concentrate may be refractionated one or more times in an attempt to increase the toluene concentration and at the same time to recover the rejected hydrocarbon material for subsequent use. One widely used method for the final purification of toluene concentrates is by acid treatment with sulfuric acid. Such treatment removes olefins and diolefins as polymeric material which may be ultimately separated as a tarry, sludge-like material. However, it is impractical to remove all of the contaminating olefins or diolefins by this method because of the high losses of toluene through sulfonation resulting from repeated acid treatments. It has been found that one to two treatments with 93 per cent sulfuric acid reduce the olefin content to a low value, but not sufficiently low to meet nitration grade specifications. Further treatments result in high toluene losses through sulfonation. Tests have shown that as many as 5 to 7 acid treatments may be necessary to produce nitration grade toluene from certain stocks. Consequently it is desirable to acid treat as few times as possible. Generally, one to two treatments are preferred and other less destructive means are used for the removal of the final traces of the unsaturated compounds.

One method of effecting the removal of the final traces of the olefins and diolefins remaining after acid washing is to treat with aluminum chloride. Anhydrous aluminum chloride is an active polymerizing catalyst for olefins and diolefins. It also reacts with these unsaturated compounds to form complexes which are of a sludgy or tarry nature and therefore easy to remove. However, it has been found difficult to obtain consistently satisfactory results when using aluminum chloride alone as a final refining agent. I have discovered a method for overcoming this difficulty wherein a consistently uniform product can be produced.

An object of my invention is to provide a method for producing aromatic hydrocarbons of relatively high purity.

Another object of my invention is to provide a method for segregating such aromatic hydrocarbons as benzene, toluene, etc., in relatively pure form from stocks containing these and other hydrocarbons.

Still another object of my invention is to provide a method for the separation of toluene from stocks containing same and its ultimate purification to meet nitration specifications.

Still other objects and advantages of my process will be apparent to those skilled in the art from a careful study of the following detailed description, in which The figure represents a diagrammatic arrangement of apparatus in which the process of my invention may be practiced.

I have discovered a method for the treatment of toluene or of toluene concentrates for the removal of unsaturated hydrocarbons whereby nitration grade toluene can be economically and consistently produced. As mentioned hereinbefore one method for the removal of unsaturated hydrocarbons from toluene concentrates is to treat with anhydrous aluminum chloride, but I have found in daily operations that the use of aluminum chloride alone cannot be depended upon to produce consistently toluene of the required purity. I have found that by the use of free or metallic iron along with aluminum chloride that the unsaturated content can be substantially completely removed, in fact so nearly completely removed, that daily production of specification toluene is easily attained.

The treatment, according to my invention, may be carried out in a fractionating tower or other suitable vessel wherein the aluminum chloride treating agent may be retained primarily within the liquid phase and the free iron exhibiting relatively great surface in the vapor phase section of the vessel. In a packed column the free iron may conveniently serve as all or only a portion of the packing material, as desired. By carrying out the treatment in a fractionating column permits the simultaneous treatment and separation of the toluene from the resultant aluminum chloride sludge as well as from a large portion of any free, unreacted aluminum chloride which may be present.

For the production of a nitration grade toluene from an aromatic oil fraction produced by cracking petroleum hydrocarbons, the following series of steps may be followed. First, the aromatic oil fraction is distilled to recover a toluene and lighter fraction. This fraction may be prepared in a conventional bubble cap type fractionating column, packed column, etc., at atmospheric, superatmospheric or even subatmospheric pressure, as desired. Steam distillation may also be employed. Usually, however, it will be desirable to operate at atmospheric or slight superatmospheric pressure. In cases where the aromatic oil stock is a product from thermal cracking of light hydrocarbons such as propane, ethane, etc., wherein the cracking operation is controlled primarily for the production of diolefins, it may be desirable to use vacuum or steam distillation to prepare this toluene and lighter fraction. Steam or vacuum distillation in such cases may be desirable because of the possibility of the presence of cyclopentadiene polymer in substantial amount. Distillation at atmospheric or higher pressures may result in temperatures sufficiently high to depolymerize the cyclopentadiene polymer. The resultant depolymerized material will appear in the toluene and lighter fraction, and will subsequently have to be removed along with other olefins and diolefins. Consequently, by fractionating at sufficiently low temperature, such as by steam or vacuum distillation, the amount of olefins and diolefins to be removed subsequently from the toluene and lighter fraction can be materially reduced.

The second step consists in fractionally distilling the above described toluene and lighter fraction to remove the larger portion of the materials boiling below toluene. The toluene is retained in the kettle product which is subjected to another fractional distillation which is intended to separate still more of the hydrocarbons boiling below toluene. Still another fractionation is frequently required to yield a toluene concentrate of the desired narrow boiling range, but this material still may contain as much as 6 to 10% of unsaturated compounds calculated as monoolefins. This fraction may be acid treated and separated from the unused acid and resultant sludge, by conventional methods. This acid treated material is next caustic washed to remove any free acid or acid sulfates retained therein. After the caustic washing step, the once acid treated toluene is again distilled and produces a toluene product having less than 1° C. boiling range. This product will meet the boiling range specifications for nitration grade toluene but still contains too high a percentage of unsaturates to meet the acid wash color test specification (Barrett).

It is at this point that the aluminum chloride treatment is employed for the removal of the final traces of olefins or diolefins. The acid treated 1° C. boiling range stock is introduced into the kettle of a fractionating column along with about 0.5% to 1.0% of anhydrous aluminum chloride. The fractionating column may be a packed column wherein all or a portion of the packing consists of metallic iron, or the column may be a bubble cap type wherein one or more trays are covered with a sufficient amount of iron packing, steel wool, or other iron having a relatively large surface, to effect the desired results. The toluene fraction is distilled in this column, so prepared, to obtain good contact between the aluminum chloride, metallic iron surface and the toluene stock, and to separate subsequently the toluene from the resultant aluminum chloride sludge.

The aluminum chloride treated toluene is given a final treatment with caustic soda, such as flake caustic, to remove any entrained, dissolved, or volatilized aluminum chloride carried over with the toluene from the aluminum chloride treating step. This final caustic treatment also removes any HCl which may be produced during the aluminum chloride treating step.

The function of the metallic iron in the vapor phase in the aluminum chloride treating step is not entirely understood. It is known, however, that during this treating step or fractionation some aluminum chloride is volatilized with the toluene and refluxes through the column. Possibly all, or at least some of the reaction between the aluminum chloride and the olefins apparently occurs in the vapor space of the column. This belief is substantiated because of the deposition of aluminum chloride sludge on the metallic iron packing material some trays above the kettle. This sludge is relatively nonvolatile, consequently, its presence on the iron packing cannot be readily construed to mean that the sludge is vaporized in the kettle and carried upward through the column along with the toluene and/or aluminum chloride. I have also found that if this sludge is not present on the metallic iron packing, little or no removal of olefins and diolefins occurs. It was thought at one time that possibly any packing material which was readily wetted by the sludge and from which the sludge would not drain readily, or would not be washed off easily by the reflux would be satisfactory. Several different packing materials were tried in an attempt to settle this point. It was found, however, that to a certain extent the effectiveness of the aluminum chloride treating was a function of the degree to which the packing was wetted by the aluminum chloride sludge and the ease with which the sludge was washed off the packing by the reflux. However, the final conclusion was that none of the packings, other than free iron, tried in conjunction with the aluminum chloride treating step gave consistently good results. It was thus concluded that free, metallic iron acts as a promotor for the aluminum chloride in effecting the removal of olefins and diolefins from an aromatic fraction. However, it is not to be construed that this invention is necessarily to be limited by this conclusion, since the actual mechanism involved is not definitely established.

The following tabulation shows some of the data obtained while studying the effectiveness of various types of packing material used in the aluminum chloride treating step for removal of final traces of unsaturated compounds from toluene:

| Packing | Reflux time, minutes | Acid wash color | Weight per cent AlCl₃ | Remarks |
|---|---|---|---|---|
| GLASS COLUMN ||||| 
| Glazed ceramic Raschig rings | 15 | 5+ | 1.00 | |
| Do | 15 | 6 | 1.00 | Steel wool in kettle liquid. |
| Do | 30 | 4+ | 0.25 | |
| Do | 30 | 5 | 0.50 | |
| Do | 30 | 1 | ---------- | Steel wool in vapor space of kettle. |
| Do | 30 | 4 | 0.50 | Metal cloth support for packing. |
| Broken building brick | 30 | 2− | 0.50 | Do. |
| Do | 30 | 1+ | 0.50 | Do. |
| Do | 0 | 1+ | 2.50 | Do. |
| Do | 10 | 0 | 2.00 | |
| Steel wool | 10 | 0 | 0.25 | |
| Do | | | | |
| IRON COLUMN ||||| 
| Broken building brick | 0 | 3 | 1.00 | |
| Do | 0 | 1 | 1.00 | |

These data show that it is possible to get reasonably good olefin and diolefin removal using packings other than free iron, however, results obtained were not consistently satisfactory. It may also be noted that the presence of free iron in the liquid phase of the aromatic hydrocarbon being treated did not give satisfactory results. When the metallic iron was placed in the vapor space of the kettle or used as packing in the column, the results obtained were consistently satisfactory. The use of an iron fractionating column with broken building brick, the packing other than metallic iron which worked best, gave but little better results than broken building brick supported on a metal screen in a glass column. In other words, it appears that not only is the presence of metallic iron desirable, but for the most effective results it is desirable that it be in a form and so placed as to permit efficient contact with the toluene vapors.

Referring now to the figure which shows diagrammatically apparatus in which my invention may be carried out, the toluene containing hydrocarbon stock enters the system by way of a line 1, is fractionated in a fractionator 2 in which a toluene and lighter fraction passes overhead. This overhead material then passes through a line 3 into another fractionator 4 in which the lighter material is removed from the toluene, the latter being withdrawn through line 5 and passed to still another fractionator 14. Toluene is withdrawn as bottoms and passed through a line 6 to a final fractionator 7 from which the toluene containing from 6 to 10% unsaturated hydrocarbons of substantially the same boiling points as toluene passes off as an overhead product. This overhead toluene material is conducted by a line 8 to a sulfuric acid treater 9 for removal of the major portion of the unsaturated materials. From this treater the toluene passes by a line 10 into a caustic washer 11 for removal of acidic materials. From the caustic washer the toluene passes by a line 12 to a fractionator 13 from which the toluene passes off overhead as a product having a boiling range of less than 1° C.

This 1° C. boiling range toluene containing a small amount of unsaturated constituents passes from the said fractionator 13 by way of a line 15, a portion of the stream being passed by a pump 16 through a line 33 into an aluminum chloride pot 17 in which the toluene stock picks up fresh aluminum chloride. The stock and some aluminum chloride then pass by way of a feed surge tank 19, a line 20 finally into a fractionator 21. This fractionator may be a packed column type or a bubble cap type as hereinbefore mentioned, but in either case the column carries a metallic iron contacting material 22. Aluminum chloride, aluminum chloride sludge and toluene may be withdrawn from the bottom of the fractionator 21 and recycled through a line 23 into the toluene feed line 15. The original toluene feed not diverted through the aluminum chloride pot 17 passes on in line 15 into the feed surge tank 19. The recycle material from the bottom of the fractionator 21 which enters line 15 by way of said line 23 is also split into two portions, one passing with the feed toluene into the pot while the remainder passes with the remainder of the feed toluene into the surge tank 19. Reject aluminum chloride sludge may be withdrawn from fractionator 21 by way of a line 32 for disposal as desired.

The purified toluene passes overhead from the said contactor-fractionator 21 through a line 24, is condensed in a cooler 25 and accumulated in an accumulator 26. From this accumulator, toluene is transferred by a pump 27 through a line 29 into a flake caustic contactor 30, a portion, however, being recycled through a line 28 into the top of the fractionator 21 as reflux. From the flake caustic contactor the purified toluene passes to a storage vessel 31 as nitration grade toluene having an acid wash color value of substantially 0.

Such conventional auxiliary apparatus and equipment as coolers, heaters, condensers, pumps, valves, automatic controls, etc., all of which are well known in the art, are, for purposes of simplicity, not shown in the drawing. The fractionating equipment, acid treater, caustic washer and flake caustic contactor are also of standard design and the operation of which is well known in the art. A tar trap may be used in line 10.

Similarly, such operating terms as "reflux time," which term refers to the difference between the time at which refluxing begins and the time at which the first condensate is received, and such terms as "acid wash color," which indicate the proportion or amount of unsaturated hydrocarbons in a standard volume of toluene, are well known to those skilled in the art.

The process as herein described should not be limited to the separation and purification of toluene since the method may be applied with equal success to the production of other aromatics, as for example, benzene, xylenes and others.

What I claim is:

1. A process for refining a close cut aromatic hydrocarbon fraction containing undesirable unsaturated hydrocarbon impurities, which comprises distilling the aromatic hydrocarbon fraction in the presence of anhydrous aluminum chloride and metallic iron whereby the unsaturated hydrocarbon impurities combine with the aluminum chloride to form a sludge-like material, the metallic iron being disposed in the vapor phase portion of the distillation apparatus and the aluminum chloride disposed in the liquid phase portion, said metallic iron promoting the formation of said sludge-like material.

2. A process for preparing nitration grade toluene from a close cut toluene fraction containing unsaturated hydrocarbon impurities, which comprises distilling the toluene fraction in the presence of anhydrous aluminum chloride and metallic iron whereby the unsaturated hydrocarbon impurities combine with the aluminum chloride to form a sludge-like material, the metallic iron being disposed in the vapor phase portion of the distillation apparatus and the aluminum chloride disposed in the liquid phase portion, said metallic iron promoting the formation of said sludge-like material, removing the distillate and contacting same with a caustic alkali and finally recovering the nitration grade toluene.

3. A unitary process for preparing nitration grade toluene from hydrocarbon charge stocks containing toluene comprising passing the toluene containing stock to a fractional distillation zone whereby a toluene cut is separated having a very narrow boiling range and containing unsaturated hydrocarbon impurities, treating said close cut fraction with sulfuric acid to remove the major portion of said impurities, fractionally distilling said acid treated material to produce a toluene stock having a boiling range within about 1° C., distilling said close cut toluene stock in the presence of anhydrous aluminum chloride and metallic iron whereby substantially the remaining unsaturated hydrocarbon impurities combine with the aluminum chloride to form a sludge-like material, the metallic iron being disposed in the vapor phase portion of the distillation apparatus and the aluminum chloride disposed in the liquid phase portion, said metallic iron promoting the formation of said sludge-like material, removing the toluene distillate and treating same with caustic alkali and finally recovering the nitration grade toluene.

4. A process for preparing nitration grade toluene from a close cut sulfuric acid treated hydrocarbon fraction containing toluene, and some unsaturated hydrocarbon impurity, the acid treated fraction having a boiling range of about 1° C. or less, comprising distilling the acid treated toluene fraction in the presence of approximately 0.5 to 1.0 weight percent of anhydrous aluminum chloride, and metallic iron, said iron having a relatively large surface area, whereby the said impurity combines with the aluminum chloride to form a sludge-like material, the metallic iron being disposed in the vapor phase portion of the distillation apparatus and the aluminum chloride disposed in the liquid phase portion, said metallic iron promoting the formation of said sludge-like material, removing the distillate and contacting same with a caustic alkali and finally recovering the nitration grade toluene.

5. A process for preparing nitration grade toluene from a close cut toluene fraction containing unsaturated hydrocarbon impurities which comprises distilling the fraction in the presence of approximately 0.5 to 1.0 weight percent of anhydrous aluminum chloride, and metallic iron, said iron having a relatively large surface area per unit of weight, whereby said impurities combine with the aluminum chloride to form a sludge-like material, the metallic iron being disposed in the vapor phase portion of the distillation apparatus and the aluminum chloride disposed in the liquid phase portion, said metallic iron promoting the formation of said sludge-like material, removing the distillate and contacting same with a caustic alkali and finally recovering the nitration grade toluene.

6. A process for preparing nitration grade toluene from a close cut toluene fraction containing unsaturated hydrocarbon impurities which comprises distilling the fraction in the presence of approximately 0.5 to 1.0 weight percent of anhydrous aluminum chloride, and metallic iron, said iron having a relatively large surface area per unit of weight, whereby said impurities combine with the aluminum chloride to form a sludge-like material, the metallic iron being disposed in the vapor phase portion of the distillation apparatus and the aluminum chloride disposed in the liquid phase portion, said metallic iron promoting the formation of said sludge-like material and the sludge-like material collecting on said metallic iron of large surface per unit of weight, removing the distillate and contacting same with a caustic alkali, and finally recovering the nitration grade toluene.

WALTER L. RIPPETEAU, JR.